Figure 1:
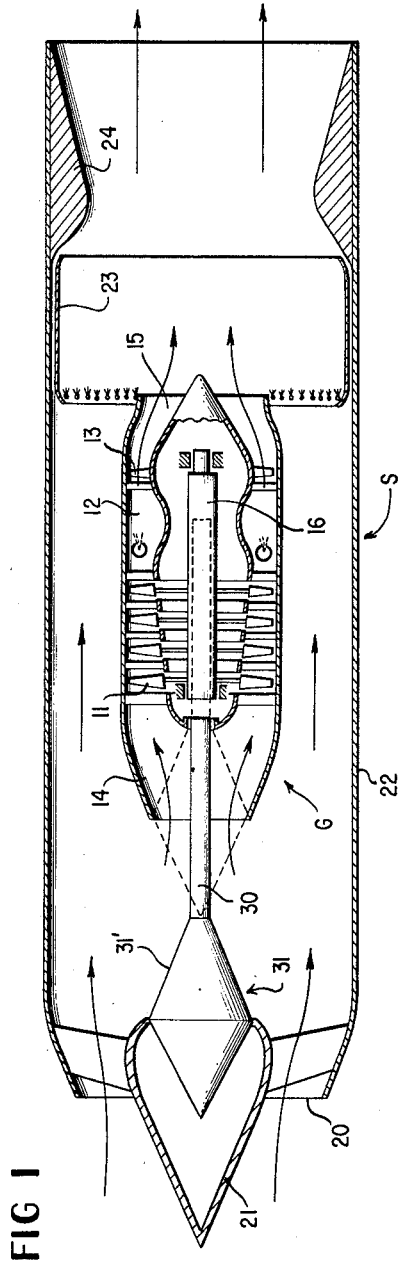

April 6, 1965   B. ECKERT   3,176,462
PROPULSION UNIT FOR AIRPLANES
Filed July 28, 1961

INVENTOR.
BRUNO ECKERT
BY Dicke, Craig & Freudenberg
ATTORNEYS.

3,176,462
PROPULSION UNIT FOR AIRPLANES
Bruno Eckert, Stuttgart-Oberturkheim, Germany, assignor to Daimler-Benz Aktiengesellschaft, Stuttgart-Unterturkheim, Germany
Filed July 28, 1961, Ser. No. 127,614
Claims priority, application Germany, Aug. 4, 1960, D 33,945
2 Claims. (Cl. 60—35.6)

The present invention relates to a combination propulsion or drive unit for propelling airplanes, essentially consisting of a ram jet unit and of a gas turbine jet propulsion unit, preferably built concentrically into the ram jet propulsion unit, which together or alternately take over the propulsion of the airplane, namely the gas turbine jet propulsion unit during starting and in the relatively low velocity range and the ram jet propulsion unit in the relatively high velocity range whereby with a turned-off turbine drive unit the air inlet thereof is blocked or closed off.

As already mentioned, the combination propulsion or drive units are provided for airplanes which are intended to cover a very large velocity range up to a velocity of Mach 5. The drive unit installations presently available to date for airplanes are, individually considered, either not capable to cover the entire velocity range or the characteristics thereof do not permit at all an operation in one of the two velocity ranges. In that connection, it should be mentioned that the gas turbine jet drive or propulsion unit can be used, for velocities above 2.5 to 3 Mach, only with difficulties and in a very uneconomical form. In contrast thereto, the ram jet drive or propulsion unit is particularly suitable for these relatively high velocities and above such velocities whereas the ram jet drive unit is not capable to start of its own force or to develop with low velocities a sufficient output.

For the foregoing reasons, recourse is had to the so-called combined or combination drive or propulsion units which are composed of a gas turbine jet drive unit and of a ram jet drive unit. It is thereby appropriate and necessary in the flight Mach range above 3 in which the gas turbine jet drive unit is rendered inoperative for purposes of avoiding thermal overloads as a result of the areodynamic heaing effect due to the ram effect, to avoid a flow or passage of the air through the gas turbine jet drive unit. Since at flight velocities of Mach number 5 the pressure ratio as a result of the aerodynamic ram effect or velocity head with internal or rectilinear impact diffusors is of the order of magnitude of approximately 30 and with external or inclined impact diffusors of approximately 150 and consequently temperature increases occur of the order of magnitude between 600 and 900° C., the simple closure mechanisms such as iris diaphragms or sheet metal flaps which have been used heretofore or have been proposed to date for the closing of gas turbine jet drive units no longer measure up to the intended task by reason of the heat damages occurring therein.

The present invention is concerned with the task to produce a closure for the air inlet of the gas turbine jet drive unit which is capable of withstanding the highest loads occurring during operation of the ram jet unit and which additionally assumes certain functions of the air inlet.

As a solution to the underlying problem, it is proposed in accordance with the present invention for closing the air inlet of the gas turbine jet drive unit to provide an aerodynamically correct closure body in front of the gas turbine jet drive unit which is arranged centrally thereof and substantially concentrically therewith and which is adapted to be displaced in the longitudinal direction of the drive unit.

According to a further development of the present invention, it is additionally proposed to construct the closure body member of double-conical shape and to provide the same with a guide part which is displaceably supported within the compressor drive shaft whereby, in the closure position thereof, the compressor inlet is closed off by the rear conical portion of the closure body member.

With a supersonic air inlet constructed as an inclined impact diffusor, it is additionally proposed in accordance with the present invention to arrange the closure body member within the central body member of the inclined impact diffusor. One embodiment in accordance with the present invention may thereby consist of an arrangement in which the forward conical portion of the closure body member forms the apex or peak of the inclined impact diffusor or of the central body member, the forward aperture of which serves, with a retracted closure body member, as air inlet for the gas turbine drive unit.

During simultaneous operation of the two drive units, namely of the gas turbine jet drive unit and of the ram jet drive unit, the closure body member is in the retracted position thereof in which it frees the forward air inlet aperture of the central body member. The rear part of the closure body member thereby forms the inner wall of the rear section of the air inlet for the gas turbine jet drive unit.

There is produced by an arrangement according to the present invention a heat resistant and therewith operationally safe closure of the air inlet for the gas turbine jet drive unit. The closure body member thereby simultaneously assumes also certain functions of the air inlet. In the last-mentioned modification of the present invention, this is the case both during operation of the ram jet drive unit as also during operation of the gas turbine jet drive unit.

Accordingly, it is an object of the present invention to provide a combination propulsion installation for propelling aircrafts adapted to cover a very wide range of flight velocities and consisting of a ram jet drive unit and of a gas turbine drive unit which effectively eliminates, in a simple manner, the shortcomings and inadequacies of the prior art constructions.

It is another object of the present invention to provide a combination propulsion unit for aircrafts essentially consisting of a ram jet drive unit and of a gas turbine drive unit which is reliable and safe in operation even at flight velocities, for example, at Mach 5 in which there occurs substantial heating of certain parts of the unit.

Still another object of the present invention resides in the provision of a combination propulsion or drive unit for aircrafts consisting of a ram jet drive unit and of a gas turbine jet drive unit in which a flow of air through the gas turbine jet drive unit is effectively prevented within the flight velocity range in which the gas turbine jet drive unit is rendered inoperative without producing excessive heating of the parts effectuating closure of the air inlet.

Still a further object of the invention resides in the provision of a closure member for gas turbine jet drive units particularly those associated with, and preferably disposed within a ram jet unit, which is capable of withstanding the thermal stresses to which such closure member may be subjected at speeds in excess of 2.5 or 3 Mach.

Still another object of the present invention resides in the provision of closure means for the air inlet of a gas turbine jet drive unit for aircrafts, particularly for a gas turbine unit arranged concentrically within a ram jet, which are not only capable of withstanding the maximum thermal loads and stresses but also take over other operational functions in various operating phases of the propulsion unit.

Figure 2:
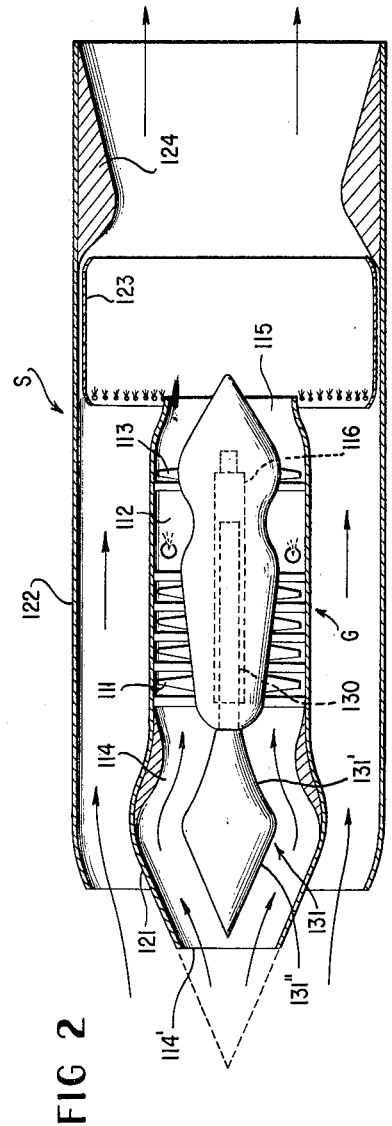

These and other objects, features and advantages of the present invention will become more obvious from the following description when taken in connection with the accompanying drawing which shows, for purposes of illustration only, two embodiments in accordance with the present invention and wherein FIGURE 1 is a somewhat schematic longitudinal cross sectional view through a first embodiment of a combination drive unit, and FIGURE 2 is a somewhat schematic longitudinal cross sectional view through a modified embodiment of a combination propulsion unit in accordance with the present invention in which the closure member is different from that of FIGURE 1.

Referring now to the drawing and more particularly to FIGURE 1, the combined drive unit illustrated therein is composed of a ram jet drive unit generally designated by reference character S and of a gas turbine jet drive unit generally designated by reference character G, the gas turbine jet drive unit G being arranged concentrically within the ram jet drive unit S. The gas turbine drive unit G comprises, as its main parts, a turbo-compressor 11, a combustion chamber 12 provided with conventional injection means, a gas turbine 13, an air inlet 14 and a thrust nozzle 15, all of these elements being of the conventional construction. The ram jet drive unit S comprises, as its main parts, the supersonic inlet 20 which may be constructed as an inclined impact diffusor provided with a central body member 21, the ram jet pipe 22 in which the air is compressed by deceleration, the combustion chamber 23 provided with appropriate fuel injection means and the thrust nozzle 24 all of which again may be of conventional construction.

The guide part 30 of an aerodynamically correct closure body member generally designated by reference numeral 31 is supported longitudinally displaceably within the compressor drive shaft 16, itself of hollow construction. The closure body member 31 which itself is accommodated within the central body member 21 is constructed of double concial shape whereby the rear conical portion 31' closes, in the retracted position of the closure member 31, indicated in FIGURE 1 in dash line, the air inlet 14 for the compressor 11 of the gas turbine jet drive unit G.

In the embodiment of FIGURE 2 in which elements corresponding to those of FIGURE 1 are designated by similar reference numerals of the 100 series, the forward conical portion 131" of the closure body member generally designated by reference numeral 131 forms, in the forward postion thereof, the point or apex of the central body member 121 provided with an air inlet aperture 114' for the compressor 111. In the forward position of the closure body member 131, the air inlet for the compressor 111 of the gas turbine jet drive unit G is effectively closed off. In contrast thereto, in the retracted position of the closure body member 131, the air inlet 114 for the gas turbine jet drive unit G is freed or opened up whereby the rear conical portion 131' of the closure body member 131 forms the inner wall of the rear section of the air inlet and cooperates, in this task, with appropriately shaped inner wall portions of the turbine unit housing.

While I have shown and described two embodiments in accordance with the present invention, it is understood that the same is not limited thereto but is susceptible of many changes and modifications within the spirit and scope thereof, and I therefore do not wish to be limited to the details shown and described herein but intend to cover all such changes and modifications as are encompassed by the scope of the appended claims.

I claim:
1. A combination propulsion unit for airplanes comprising ram jet propulsion means and gas turbine jet propulsion means which together or alternately provide the propulsion means for the plane, namely said gas turbine jet propulsion means during starting and in the relatively low velocity range and said ram jet propulsion means in the relatively high velocity range, said ram jet propulsion means including a ram jet pipe having a supersonic air inlet, supersonic diffusor means arranged adjacent said air inlet, a combustion chamber, fuel injection means and thrust nozzle means, said gas turbine jet propulsion means being arranged within said ram jet propulsion means coaxially thereof, said gas turbine jet propulsion means including a housing containing a turbo-compressor having a drive shaft, a combustion chamber, fuel injection means, a gas turbine and a thrust nozzle means, said housing being provided with air inlet means for the compressor, closure means for the air inlet means of said gas turbine propulsion means adapted to be closed when the gas turbine propulsion means is rendered inoperative, said supersonic diffusor means being constructed as inclined impact diffusor having a central body member, said central body member being disposed in said supersonic air inlet, said closure means being arranged in front of said air inlet means for said gas turbine propulsion means and including an aerodynamically correct closure body member having a forward conical portion and a rear conical portion, and means for displacing said closure body member in the longitudinal direction of said gas turbine propulsion means to a rearward closure position and a forward position to thereby selectively open and close said inlet means for the gas turbine propulsion means with the rear conical portion of said closure body member closing said air inlet means for the gas turbine propulsion means in said rearward closure position of said closure means, and said forward conical portion being received in said central body member in said forward position of said closure body member.

2. A combination propulsion unit for airplanes comprising ram jet propulsion means and gas turbine jet propulsion means which together or alternatively provide the propulsion means for the plane, namely said gas turbine jet propulsion means during starting and in the relatively low velocity range and said ram jet propulsion means in the relatively high velocity range, said ram jet propulsion means including a ram jet pipe having a supersonic air inlet, supersonic diffusor means arranged adjacent said air inlet, a combustion chamber, fuel injection means and thrust nozzle means, said gas turbine jet propulsion means being arranged within said ram jet propulsion means coaxially thereof, said gas turbine jet propulsion means including a housing containing a turbo-compressor having a drive shaft, a combustion chamber, fuel injection means, a gas turbine and a thrust nozzle means, said housing being provided with air inlet means for the compressor, closure means for the air inlet means of said gas turbine jet propulsion means adapted to be closed when the gas turbine propulsion means is rendered inoperative, said supersonic diffusor means being constructed as inclined impact diffusor having a central body member, said central body member being hollow and being disposed within said supersonic air inlet, said closure means being arranged in front of said air inlet means for said gas turbine propulsion means and including an aerodynamically correct closure body member and a guide member therefor arranged so as to be longitudinally displaceable within said compressor drive shaft, said closure body member having a forward conical portion and a rear conical portion, means for displacing said closure body member in the longitudinal direction of said gas turbine propulsion means to thereby selectively open and close said inlet means for the gas turbine propulsion means with the rear conical portion of said closure body member closing said air inlet means for the gas turbine propulsion means in the closure position of said closure means, and the forward conical portion of said closure body member being received within said central body member in the forward position of said closure body member which corresponds to the operative condition of said gas turbine jet drive means.

References Cited in the file of this patent

UNITED STATES PATENTS

| | | |
|---|---|---|
| 2,677,232 | Collins | May 4, 1954 |
| 2,955,414 | Hausmann | Oct. 11, 1960 |
| 2,970,431 | Harshman | Feb. 7, 1961 |